April 14, 1970  B. I. BONGA  3,506,559
APPARATUS FOR ELECTRICAL MACHINERY OF CURRENT
CONDUCTIVE WORKPIECES Filed Sept. 11, 1967  3 Sheets-Sheet 1

INVENTOR
BENNO IBO BONGA
BY Claude A. Patalidis
ATTORNEY

United States Patent Office 3,506,559
Patented Apr. 14, 1970

3,506,559
APPARATUS FOR ELECTRICAL MACHINERY OF CURRENT CONDUCTIVE WORKPIECES
Benno Ibo Bonga, Onex, Geneva, Switzerland, assignor to Ateliers des Charmilles S.A., Geneva, Switzerland, a corporation of Switzerland
Filed Sept. 11, 1967, Ser. No. 666,636
Claims priority, application Switzerland, Sept. 13, 1966, 13,229/66
Int. Cl. B23p 1/14; B01k 3/00
U.S. Cl. 204—224                6 Claims

ABSTRACT OF THE DISCLOSURE

Apparatus for the electrical machining of substantially large and bulky workpieces having a removable assembly mechanically interconnecting the electrode tool and the workpiece, although electrically insulated from one or the other, or both, including servo controlled jack means for advancing the electrode tool and the workpiece relatively to each other and a synchro system for operating all the jacks in synchronism.

BACKGROUND OF THE INVENTION

This invention relates to apparatus and methods for forming and shaping metallic workpieces by means of electrical machining of such workpieces, and more particularly the invention relates to apparatus and method for machining substantially heavy and bulky workpieces by electrical erosion by means of a substantially bulky and heavy electrode tool, including an appropriate mechanism for maintaining the electrode tool a predetermined distance away from the workpiece and for automatically feeding the electrode tool into the workpiece during machining of the workpiece.

It has already been known for some time that metallic workpieces or workpieces made of electrically conductive material may be machined by removal of material from the workpiece surface under the action of an electrical current being passed between an electrode tool and the workpiece. The electrical current may be in the form of electrical discharges between the electrode and the workpiece, occurring in a narrow space between the electrode and the workpiece which is filled with a dielectric liquid. It is also known to utilize a current conductive electrolyte instead of dielectric liquid, and the material removal from the workpiece is accomplished, under those conditions, by electrochemical effect.

Such apparatus and methods give excellent results in the course of machining workpieces of relatively small dimensions, and are very effective for machining materials which are too hard to machine by more conventional apparatus and methods. However, when the machining is to be effected on workpieces of substantially large dimensions, for example, when the workpieces consist of dies for stamping or forming large dimension panels such as are used in motor vehicle bodies, the workpieces and the electrodes are voluminous and of a weight that may reach several tons, and electrical machining of such workpieces present considerable difficulties with respect to the exact relative positioning of the parts and the rigorous control of the precise relative displacement between the electrode and the workpiece. Up to the present it has been found necessary to use a stamping press for the guiding and positioning mechanism between the electrode and the workpiece, the electrode being in general the forming punch itself and the workpiece being the die portion. Such an arrangement has many inconveniences, especially in view of the fact that the press being used for the electrical machining of the die is no longer available for its normal function of stamping metal sheets. Furthermore, such heavy presses being expensive, it is not economical to purchase a press solely for electrical machining of dies.

Large dimension electrical machining machines have also been built which, alike stamping presses, are provided with a ram supporting an electrode holder, such a ram being heavy, costly and occupying a substantial space.

SUMMARY

The present invention provides a solution to the problem presented by electrical machining of workpieces of large dimensions. The invention provides an arrangement for electrical machining of such workpieces, including a power generator for supplying the machining electrical energy, at least one electrode tool, at least one workpiece and at least one mechanism for the automatic advance, along one axis, of the electrode with respect to the workpiece. Such an arrangement is characterized by an automatic feed mechanism comprising at least three servo controlled jacks whose displacements are effected in synchronization. The jacks provide the appropriate spacing between the electrode and the workpiece and maintain accurate parallelism therebetween. The jacks are electrically insulated from either the electrode or the workpiece.

In order that the invention may be more clearly understood, three forms of apparatus for practicing the invention are described by way of examples in the following specification with reference to the accompanying drawings in which;

DETAILED DESCRIPTION OF THE PREFERRED EMBODIMENTS

Figure 1:
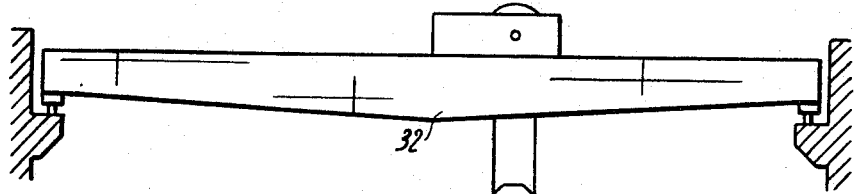
FIGURE 1 represents a schematic sectional view of a first example of embodiment of the invention.

Now referring to FIGURE 1, the invention, as described for illustrative purpose with respect to electrical machining of a metallic workpiece 1 by means of electrical discharges, contemplates mounting the workpiece 1 on a support base 2 disposed on the surface of the ground 3. The ground surface 3 is preferably made of concrete and is provided with a trench 4 completely surrounding the support base 2 for the purpose of recovering the dielectric liquid contained in the tank formed by a wall 5 surrounding the trench 4.

Workpiece 1 is, in the example shown, a die for forming large area sheet panels, such die being provided with a cavity 6 whose shape and contour must, of necessity, be an exact mirror image of the male or punch portion 7 mounted on a block 8. Electrical machining of the workpiece 1, effected by electrical erosion of the cavity 6 with a shape and contour being complementary to the shape and contour of punch portion 7, is achieved by way of electrical discharges occurring at random between the electrode or punch portion 7 and the surface of workpiece 1, while both are submerged in a dielectric liquid bath, such as a kerosene bath, the die workpiece and the punch electrode being maintained relatively to each other in a predetermined position. The electrical discharges are supplied by a generator G, which will not be described in detail herein, as it does not make any part of the present invention, such generator being any one of those well known to those skilled in the art.

The exact positioning of punch block 8 relatively to die block 1 is effected by means of guiding and feeding means comprising piston members 9 affixed to the lower surface, as seen in the drawing, of block 8, each one of which is adapted to snuggly engage and slide within the longitudinal bore of each of corresponding bushings 10, disposed in appropriate cylindrical cavities in die block 1. An insulating sleeve 11 is disposed between the outer surface of each bushing 10 and the inner surface of the corresponding cavity in the die block. A bellows 12 is disposed so as to surround each of the piston members 9 for preventing leakage of dielectric fluid into the internal bore of bushing 10.

Piston members 9 enable the punch block 8 to be displaced in either direction parallel to the axis of the piston towards and away from the die block 1. Because there are two piston members 9, as shown, displacement of the punch block 8 relatively to the die block 1 in a direction transverse to the feed axis is prevented at the same time as any angular rotation of the punch block relatively to the die block is inhibited. Because piston members 9 are not long enough to insure perfect parallelism, during relative motion of the punch block 8 with respect to the die block 1, such parallelism is insured by means of three jacks 13 controlling the exact spacing between the punch block 8 and the die block 1. Each jack 13 comprises a hydraulic motor 13a, of conventional construction and not shown in detail, adapted to rotatably drive a threaded member 14 engaging a nut 15, the threaded member 14 and the nut 15 preferably being of the type having recirculating balls. The hydraulic motors 13a are removably mounted on the side of punch block 8 by way of angle plates 16, and nuts 15 are removably attached to the side of the die block 1 by way of angle plates 17 and insulating sleeves 18.

There are at least three jacks 13, although only two are shown in the drawing, and all the jacks are driven in synchronism, such that the punch block 8 and the die block 1 remain at all times parallel to each other without requiring an assembly having a guiding slide of prohibitive length.

It is well known to those skilled in the art that the minimum distance between the workpiece and the electrode, in electro-erosion machining, must be constantly monitored in order to be precisely maintained at a predetermined value depending from many factors, principally depending from a predetermined machining voltage. If this distance or gap becomes too wide, electrical machining ceases, while if the gap becomes too narrow there is a possibility of arcing and short circuits occurring between the electrode and the workpiece which result in damages to both the electrode surface and the machined surface of the workpiece. The appropriate gap spacing is maintained by means well known to those skilled in the art, consisting of an electronic control 19 responsive to the machining voltage across the machining gap between the punch block 8 and the die block 1. The machining voltage is compared to an adjustable reference voltage as provided at the output at the potentiometer P. The electronic control 19 controls in turn a servo mechanism 20 arranged to operate all the screw jacks 13 in perfect synchronism.

Figure 2:
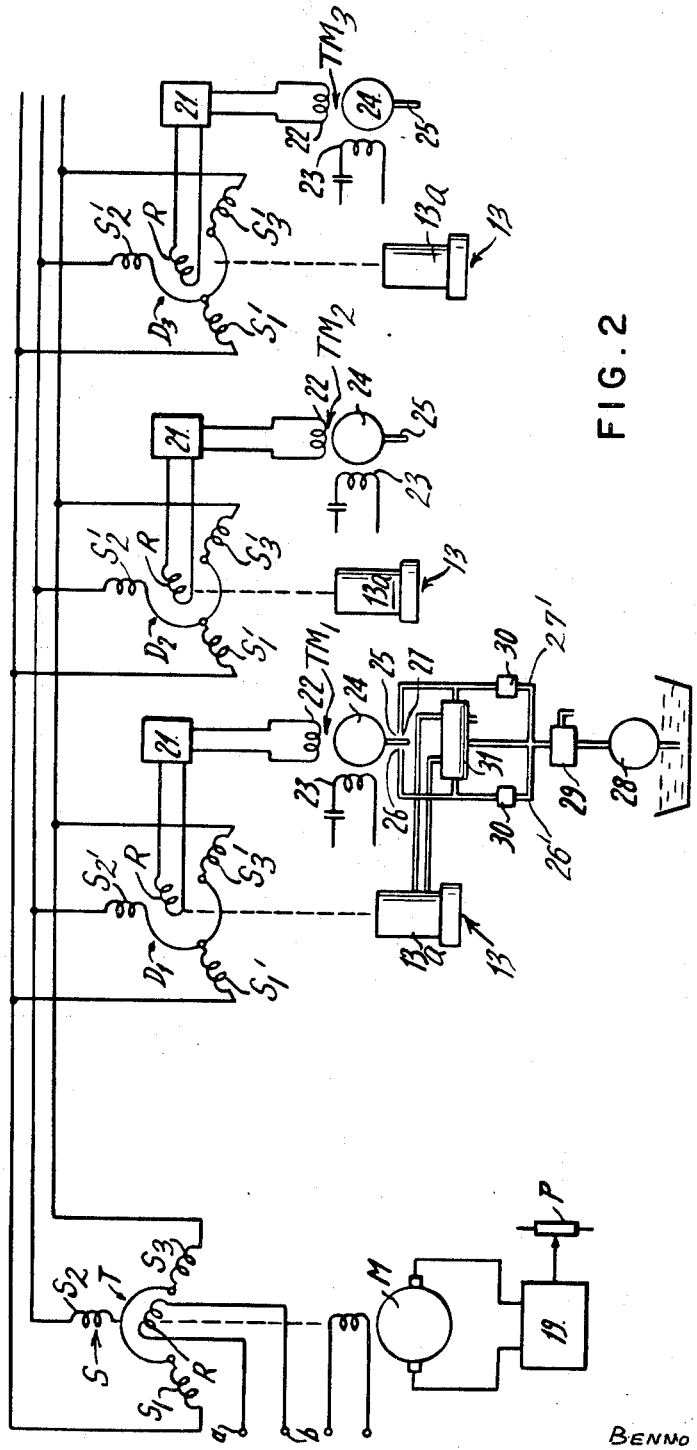
FIGURE 2 is a schematic diagram of the electro-hydraulic system portion of the embodiment of FIGURE 1.

FIGURE 2 schematically represents the electrical and hydraulic control circuit for the screw jacks 13. The electronic control 19 is adapted to control the amount and direction of rotation of an electric motor M in a direction or in another according to whether or not the machining voltage is lower or higher than the reference voltage. When the gap voltage increases above the reference voltage, the electric motor M is caused to rotate in a direction that in turn causes punch block 8 to be displaced toward die block 1, and, alternately, when the gap voltage falls below the reference voltage, motor M is caused to rotate in an opposite direction that causes punch block 8 to move away from die block 1.

This is effected by way of electric motor M functioning as a control pilot connected to each of the hydraulic motors of the jacks 13 by an electric synchro positioning arrangement as shown in FIGURE 2. Electric motor M is adapted to rotate the rotor R of a synchro transmitter T, this rotor R being supplied in alternating current by an electric source across terminals $a$ and $b$. Synchro transmitter T includes a star connected three-phase stator S, including windings S1, S2 and S3, each one of which is directly connected to the corresponding star connected three-phase stators S'1, S'2 and S'3 of each of the synchro receivers D1, D2 and D3. The stator windings of the receivers D1, D2 and D3 are placed across a voltage of an amplitude and of a phase depending on the angular misalignment between the position of the transmitter rotor R and the position of the rotor of each receiver. The rotor winding R of each of the receivers D1, D2 and D3 detects a voltage of an amplitude and phase dependent from the angular misalignment between the transmitter angular position and the appropriate detector angular position. Such voltages at the output of each rotor R of the detector D1, D2 and D3 are each supplied to an amplifier 21 which is in turn connected across a first winding 22 of a torque motor, each one of which is shown at TM1, TM2 and TM3. Each torque motor is provided with a second winding 23 which is placed across an alternating voltage out of phase by 90° with respect to the voltage applied across terminals $a$ and $b$ of the transmitter rotor R.

The rotor R of each synchro receiver D1, D2 and D3 is coupled to the driveshaft of the appropriate motor 13a of each of jack 13, such that the voltage across each of the rotors R is dependent from the difference in angular position between the appropriate jack and the rotor R of the synchro transmitter T. When there is no difference in the respective angular positions, the voltage across the appropriate receiver rotor R is equal to zero.

Each torque motor TM1, TM2 or TM3 is adapted to individually control the operation of one of the hydraulic jacks 13, but for the sake of simplification of the drawing, FIGURE 2 schematically shows only the control mechanism of the jack 13 depending from torque motor TM1. The rotor 24 of torque motor TM1 is constantly subjected to a torque of a direction and amplitude depending from the phase and amplitude differentials between the voltages applied across windings 22 and 23. The rotor 24 of the torque motor is arranged to displace a target 25 disposed between two calibrated orifices 26 and 27 through which continuously flows hydraulic fluid pressurized by a circulating pump 20. The pressurized fluid at a predetermined pressure depending from the setting of pressure regulator 29 flows into two separate branch lines or conduits 26' and 27' respectively connected to orifices 26 and 27 through calibrated pressure regulators 30, one of which is placed in each branch. The fluid pressure existing upstream of orifices 26 and 27, in lines 26' and 27' respectively, is applied to the opposite ends of the spool, not shown, of a slide valve 31.

When target 25 is exactly at mid-distance between orifices 26 and 27, the flow rates through such orifices are equal and the back pressures in the lines 26' and 27' upstream of the orifices are equal. The spool of slide valve 31 is thus in a mid-position which in turn causes the hydraulic motor 13a of jack 13 to remain motionless. However, if target 25 is caused to be displaced nearer to one or the other of orifices 26 or 27, the fluid flow restriction thus caused results in turn in an increase of back pressure in the appropriate line 26' or 27', and in a decrease of back pressure in the other line. The pressure differential on the ends of the spool of valve 31 forces the spool in a direction or the other, thus in turn causing hydraulic motor 13a to rotate in one direction or the other and actuating the jack 13 accordingly.

Consequently, for any difference or error between the angular position of one hydraulic jack and the angular position of the synchro transmitter T, there is a control command from the appropriate receiver D1, D2 or D3 displacing in turn the rotor 24 of the appropriate torque motor of an amount and direction that causes the appropriate hydraulic motor 13a to rotate in a direction and of an amount that return the corresponding jack 13 to an appropriate position. Consequently, the three hydraulic jacks 13 are continuously actuated in synchronism according to the error sign and amplitude between the position command and the actual position occupied by the punch block relatively to the die block, such that the punch block 8 remains constantly parallel to the die block 1 during the electrical machining of the die block cavity by way of the punch electrode.

Referring now again to FIG. 1, it can be seen that the arrangement there illustrated consists of a few substantially simple elements occupying a relatively small amount of space. When the electrical machining is completed, the punch block 8 and the die block 1 may be removed by means of travelling crane 32 which may be used to transport both parts to the appropriate stamping press in which they are installed for normal operation in combination with each other. It is obvious that before transferring the punch block and the die block to the appropriate stamping press, the angle plates 16 and 17 must be removed from the punch block 8 and the die block 1 respectively. The angle plates may be removed and displaced with the remaining of the mechanism still attached thereto by lifting by means, for example, of appropriate strategically disposed threaded apertures which are engaged by corresponding threaded members.

It is obvious that the arrangement illustrated at FIGS. 1 and 2 and herein described presents many advantages resulting from reduced space and cost as a result of doing away with cumbersome precision sliding assemblies. The electrical machining arrangement thus consists essentially only of the punch block 8 and die block 1 themselves, together with the hydraulic jacks 13, the control mechanism and the generator supplying the machining current. In such an arrangement, the block 8 would be provided with projecting punches adapted to punch out holes of appropriate shape in cooperation with corresponding cavities in die block 1.

Figure 3:
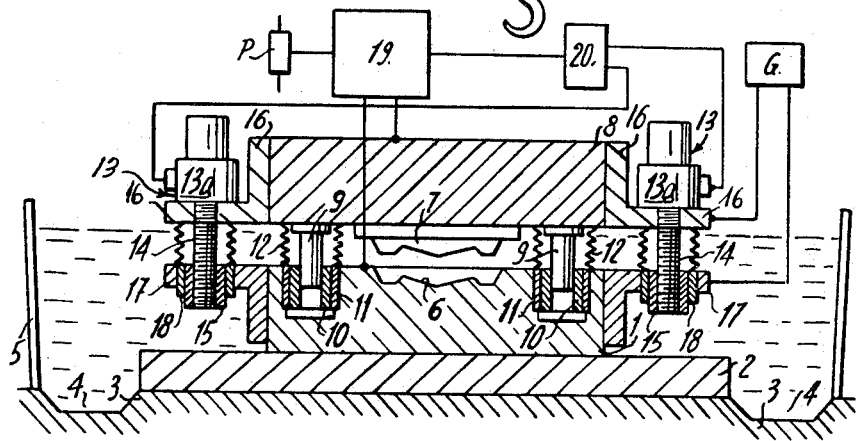
FIGURE 3 is a schematic sectional view of a second example of the embodiment of the invention.
Figure 3:
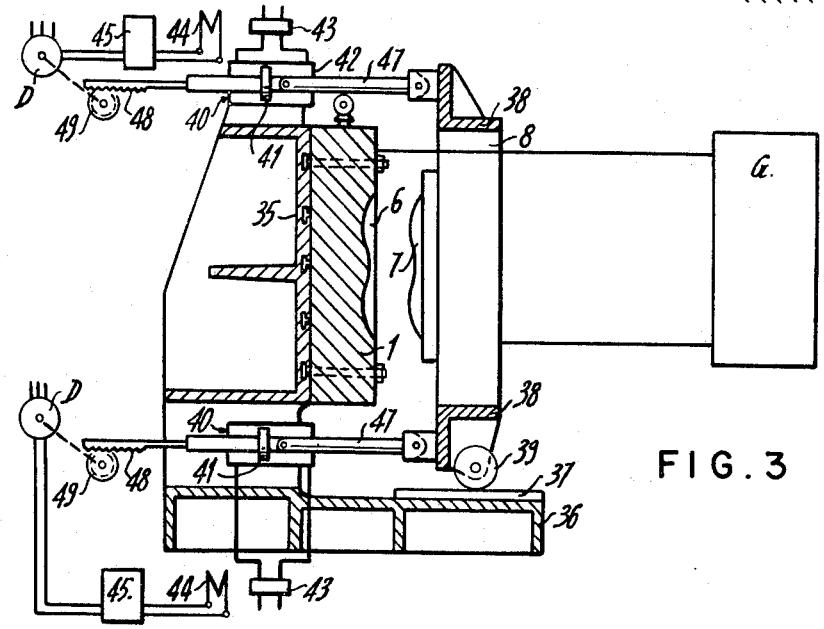

Referring now to FIG. 3, there is shown a first modification wherein the die block 1 is mounted on a stationary vertical support member 35 affixed in turn to a horizontal table 36 provided with rail members 37 forming rolling surfaces for rollers 39 supporting in turn a vertically disposed support member 38 reciprocable relatively to stationary support member 35. Reciprocable support member 38 is adapted to hold a block 8 having a projecting contoured end surface 7 for the electrical machining of a correspondingly shaped cavity 6 in a die block workpiece 1. A generator G, as presently explained, supplies the machining electrical power.

The displacement of reciprocable support member 38 with respect to stationary vertical support member 35 is effected by means of three hydraulic jacks 40, only two of which are shown in the drawing. Each hydraulic jack 40 comprises a piston member 41 adapted for reciprocation in a cylinder 42 as a result of the differential action of pressurized fluid under the control of hydraulic valve 43 controlled in turn in the same manner and by the same synchro system as previously described with respect to the embodiment of FIGS. 1 and 2. For the sake of simplifying the drawing, only one winding 44 of the appropriate torque motors adapted to control the valves 43 have been shown, each of such windings being connected across the output of an amplifier 45 connected in turn to the output of a synchro receiver D, three of such receivers simultaneously providing the synchronism between the three hydraulic jacks 40 and consequently the linear motion of the punch block 8 in function of the gap voltage across the space between the machined surface of the cavity 6 in die block 1 and the machining surface of the punch portion 7, defining the electrode tool. In order to provide a position feedback input applied to the rotor of each synchro receiver, each piston rod 47 of each piston member 42, such piston rod providing the appropriate mechanical link or connection between the piston member 41 and the movable support member 38, has a toothed rack portion or, alternately, as shown in the drawing, is provided with projecting from the other end of the cylinder 40 forming a toothed rack 48 adapted to drive a pinion 49 driving in turn the rotor of the detector D, as schematically shown.

It is obvious that in the operation of the apparatus of FIG. 3, the space between the electrode tool 7 and the die block 1 is filled with an appropriate dielectric fluid in apparatus wherein electrical discharges are used for shaping the cavity 6 in the die block 1, and that the operation of the control mechanism maintaining the appropriate gap spacing is alike the operation of the mechanism described in relation to FIG. 2 herein.

Figure 4:
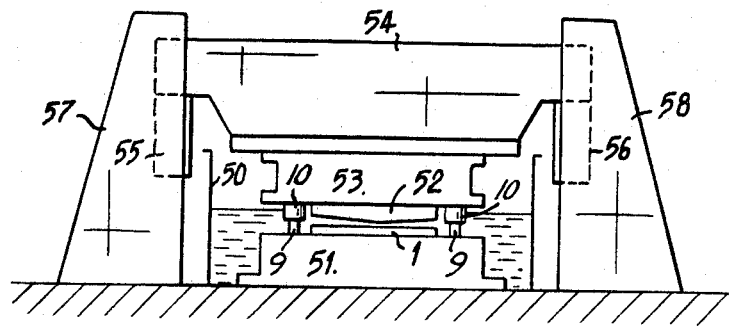
FIGURE 4 is a schematic elevational view of a third embodiment of the invention.
Figure 5:
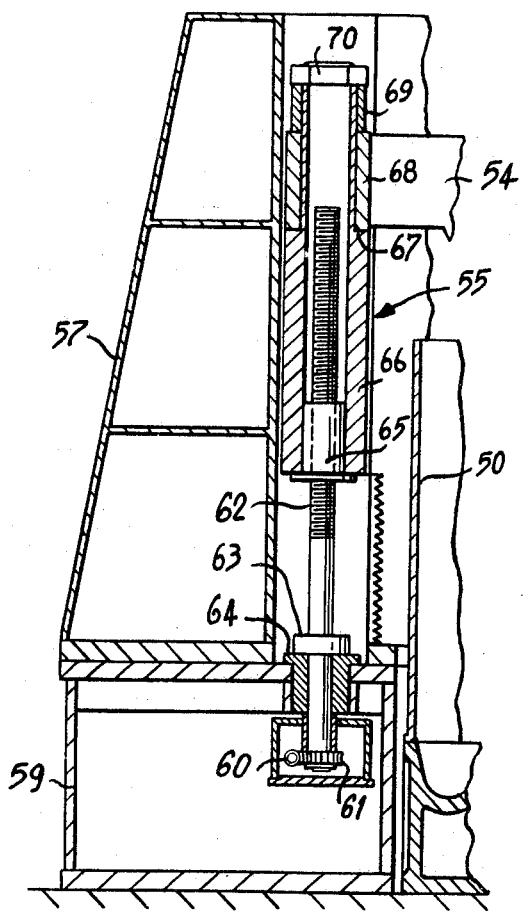
FIGURE 5 is a schematic partial sectional view of an enlarged detail of FIGURE 4.

In the example of embodiment of the invention illustrated at FIGS. 4 and 5, such embodiment is shown as comprising a tank 50 in the inside of which is placed a support 51 for a workpiece 1. The machining of the workpiece 1 is achieved by electro erosion by way of an electrode 52 supported by a holding block 53. The appropriate alignment and guiding between the workpiece support 51 and the electrode block 53 is achieved by means of piston members 9 affixed to the workpiece support 51 and each adapted to snuggly and slidably fit within a bushing member 10 affixed to the electrode block 53, substantially alike the arrangement explained in detail with respect to the embodiment of FIG. 1. It is obvious that block workpiece support 51 and electrode 53 must be electrically insulated from each other, as previously mentioned with respect to the preceding embodiments, in order to avoid any direct electrical connection therebetween. The electrode block 53 is supported by means of two cross-beam members 54, one of which only can be seen in FIG. 4, the other cross-beam member being disposed behind the one shown, each of the cross-beam members 54 being in turn supported on each of its two ends by means of jacks 55 and 56 disposed between such ends and upright support members 57 and 58 disposed exteriorly to tank 50.

FIG. 5 represents in detail only one of such vertical upright supports 57 and the corresponding jack 55, as it is evident that the two pair of jacks supporting the two cross-beam members 54 are identical in structure and operation.

Upright support member 57 is preferably made of appropriate steel plate, forming a rigid box-like construction. A base frame 59, on the top of which upright support member 57 is mounted, shelters a motor, preferably a hydraulic motor, not shown (adapted to drive, for example by means of a worm and gear drive comprising worm 60 and gear 61, a vertically disposed shaft defining a screw jack 62 provided with a thrust bearing shown schematically as comprising a shoulder portion 63 adapted for rotational abutment upon the upper end surface of a vertically axle 64 affixed to the base frame 59 and adapted to accept the lower unthreaded end of jack screw 62. The upper end of jack screw 62 threads into a nut 65 affixed at the bottom of a vertically disposed slide 66. Slide 66 is provided with an upper cylindrical portion forming an annular shoulder 67 defining a support surface for the lower surface of a cylindrical sleeve integral with or affixed to the end of cross-beam member 54. The cylindrical sleeve 68 is rigidly affixed to the upper end of slide 66 by means of a cylindrical spacer 69 and a nut 70 whose internal thread engages an outer thread on the periphery of the upper extreme end of the cylindrical portion of slide 66.

The four jacks are electrically synchronized by means of the same synchro system explained in detail with respect to FIG. 2.

In the embodiment of FIGS. 4–5, the guiding piston members 9 mounted on workpiece support block 51 and adapted to slide in bushings 10 affixed to electrode block 53 are not absolutely necessary to insure a predetermined spatial relationship between electrode 52 and workpiece 1 in a plane perpendicular to the direction of motion of the electrode. Such appropriate geometric positioning and alignment is effected by the slides 66 being disposed in the upright support members 57 with a precision fit.

A further advantage of the embodiment of FIGS. 4–5 results from the block 53 supporting the electrode 52 and affixed to cross-beam members 54 being adapted to be removed in its entirety from the machine from the top after removing nut 76 and sapcers 69 without dismantling the jacks 55. The advantage of loading and unloading both the electrode and the workpiece through the top of the machine provides a substantial advantage with respect to electro-erosion machining apparatus hitherto known wherein such operation is generally effected from the side, which is a particularly difficult mode of operation when handling heavy and cumbersome workpieces and electrodes.

It will be appreciated that other structural alternate arrangements may be provided for practing the present invention and that, for example, the synchronization of the diverse jacks, in the embodiment of FIG. 1 as well as in the embodiments of FIGS. 3, 4 and 5, may alternately be effected by means of a mechanical connection between the jacks. With such an arrangement, it is sufficient to provide only one single servo motor for controlling the appropriate gap spacing between the electrode and the workpiece, such a servo motor being arranged to mechanically control all the jacks.

It is also obvious that the synchronization of the motors driving the jacks may be effected by means of numerical control servo loops, the driveshaft of each motor being, for example, provided with a digital photoelectric position sensor inserted in each of the servo loops. In applications where the jacks provide sufficient guidance and alignment of a substantial length, which is especially the case where the jacks are made of hydraulic pistons, it becomes convenient to uitilize the jacks themselves to maintain the proper alignment of the electrode in a direction transverse to the electrode feed axis with respect to the workpiece. Thus, with an arrangement as shown in FIG. 1, the jacks 13 can be replaced by means supplying pressurized fluid within the bushings 10 for displacing upwardly the piston member 9 supporting and displacing punch block 8.

It is evident that the structural examples herein illustrated are particularly advantageous in applications including voluminous and heavy electrodes and workpieces. However, a similar arrangement can also be utilized in applications where it is desirable to machine by means of a single apparatus a plurality of production parts which can be mounted side by side on a support table for the purpose of being electro eroded by way of a plurality of electrodes mounted on a common electrode holder. Consequently, arrangements substantially alike the apparatus herein illustrated and described can be advantageously utilized for machining parts of relatively small dimension and weighing only a few pounds.

Although the invention has been shown and described by way of a few examples of preferred embodiments thereof, it is obvious that the invention is not to be limited to the specific embodiments herein illustrated and described and that various changes and modifications thereof may be resorted to without departing from the scope and spirit of the invention as defined in the appended claims.

I claim:

1. An apparatus for the electrical machining of a current conductive workpiece, said apparatus comprising an electrical generator for supplying the machining electrical power, an electrode tool having a working face, means for supporting a workpiece adjacent the working face of said electrode tool and means for automatically feeding at a predetermined rate said electrode tool and maintaining a substantially constant gap between said electrode tool working face and said workpiece, said last mentioned means comprising at least three servo controlled jacks, and servo control means for said jacks for normally controlling said jacks in synchronism, said jacks being electrically insulated so as to prevent direct electrical connection between said electrode tool and said workpiece.

2. The apparatus of claim 1 further comprising aligning and guiding means for preventing relative displacement of said electrode tool and said workpiece relatively to each other in a direct transverse to the feed axis and for preventing relative rotation around said feed axis.

3. The apparatus of claim 2 wherein said guiding means are mounted directly between said electrode tool and said workpiece.

4. The apparatus of claim 2, wherein said guiding means are integral with said jacks.

5. The apparatus of claim 1, wherein said jacks are removably attached between said electrode tool and said workpiece.

6. The apparatus of claim 1 wherein said servo control means comprises a servo motor adapted to drive a synchro transmitter in direction and amplitude dependent from the error sign and amplitude between a position command signal as defined by a voltage reference and position feedback signal as defined by the voltage across said gap, a synchro receiver for each of said jacks and individual control means for each of said jacks operated by said synchro receiver.

References Cited

UNITED STATES PATENTS

| | | | |
|---|---|---|---|
| 3,182,009 | 5/1965 | Nalband et al. | 204—225 XR |
| 3,453,192 | 7/1969 | Wilkinson | 204—224 XR |

JOHN H. MACK, Primary Examiner

D. R. VALENTINE, Assistant Examiner

U. S. Cl. X.R.

204—225

UNITED STATES PATENT OFFICE
CERTIFICATE OF CORRECTION

Patent No. 3,506,559        Dated April 14, 1970

Inventor(s) Benno Ibo Bonga

It is certified that error appears in the above-identified patent and that said Letters Patent are hereby corrected as shown below:

IN THE SPECIFICATION

Column 6, line 11, after "with" insert -- a portion --

Column 6, line 62, after "vertically" cancel "axle" and insert thereinstead -- axed bushing --

Column 7, line 17, change "sapcers" to -- spacers --

IN THE CLAIMS

Column 8, line 31, change "direct" to -- direction --

SIGNED AND SEALED
AUG 25 1970

(SEAL)
Attest:

Edward M. Fletcher, Jr.
Attesting Officer

WILLIAM E. SCHUYLER, JR.
Commissioner of Patents